United States Patent
Pierce (10) Patent No.: US 7,031,463 B2
(45) Date of Patent: Apr. 18, 2006

(54) RESISTIVE FEED RAIL GENERATION IN A POWER SUPPLY

(75) Inventor: Jason C. Pierce, Dahlonega, GA (US)

(73) Assignee: Arris International, Inc., Suwanee, GA (US)

(*) Notice: Subject to any disclaimer, the term of this patent is extended or adjusted under 35 U.S.C. 154(b) by 134 days.

(21) Appl. No.: 10/778,527

(22) Filed: Feb. 13, 2004

(65) Prior Publication Data

US 2004/0161103 A1 Aug. 19, 2004

Related U.S. Application Data

(60) Provisional application No. 60/447,865, filed on Feb. 14, 2003.

(51) Int. Cl.
*H04M 19/00* (2006.01)

(52) U.S. Cl. .......................................... 379/413; 307/80

(58) Field of Classification Search ................ 379/413, 379/413.01, 395.01, 186, 169; 455/574; 323/231, 220, 229, 304; 307/44, 54, 55, 307/61, 77; 713/324
See application file for complete search history.

(56) References Cited

U.S. PATENT DOCUMENTS 6,362,541 B1* 3/2002 Kawata ........................ 307/125
6,404,076 B1* 6/2002 Matsuda et al. .............. 307/80

* cited by examiner

*Primary Examiner*—Sinh Tran
*Assistant Examiner*—Walter F Briney, III
(74) *Attorney, Agent, or Firm*—John L. Doughty (57) ABSTRACT

A circuit provides current from a high voltage output to a low voltage output through a resistor when a load at the low voltage output is removed. The resistor provides current to keep the VBL voltage above the set point of a switching regulator that provides output power to the VBL output. Accordingly, the regulator's output stage provides a switched 0% duty cycle output and saves power until a load is presented again. Presenting a signal to either a shutdown circuit or a sleep pin shuts down the entire controller until a load is presented again. A zener diode is used to clamp the VBL at a voltage higher than the set point of the controller to ensure that the controller operates with a 0% duty cycle output while in a no-load condition. The circuitry can be configured to operate in either a positive or negative powering scheme.

21 Claims, 6 Drawing Sheets

RESISTIVE FEED RAIL GENERATION IN A POWER SUPPLY

CROSS REFERENCE TO RELATED APPLICATION

This application claims the benefit of priority under 35 U.S.C. 119(e) to the filing date of Pierce, U.S. provisional patent application No. 60/447,865 entitled "RESISTIVE FEED RAIL GENERATION IN TELEPHONY BOX", which was filed Feb. 14, 2003, and is incorporated herein by reference in its entirety.

FIELD OF THE INVENTION

The present invention relates generally to improving efficiency in battery-backed-up power supplies during battery operation, and more specifically to power saving during idle condition during a loss of off-site power event.

BACKGROUND

As the use of battery-backed-up electronic devices continues to grow at a rapid pace, manufacturers are constantly trying to improve the run-down time, or time period beginning when battery operation of a device begins until the battery can no longer supply sufficient power to operate the device. By increasing the run-down time, not only can the device operate for a longer amount of time running on battery power, but the manufacture can also use smaller, less expensive batteries for a given amount of run-down time.

One way of increasing the run-down time is to use larger batteries, as the larger a battery for a given battery type, the more charge can be stored by said battery. In addition, much research is ongoing in search of different types of batteries to provide higher and higher charge densities. While current research shows promise, improvements in batteries have been limited. Thus, another way of improving run-down time is to improve the devices themselves in order to reduce the amount of power used by the given device. Actually, this is a desirable goal regardless of the type of battery being used, because any battery, no matter how exotic, will always have a given charge density associated with it, and therefore, any improvements in device efficiency are always desirable.

Such techniques that improve, or increase, the run-down time of a device are applicable to battery usage in a device that uses batteries; such techniques are especially useful in communication devices, such as telephony over internet protocol, also referred to in the art as voice-over-IP or VoIP, because emergency service, such as 911 service, for example, must be provided during loss-of-off-site-power, or LOOP, such as occurs during a storm, for example, when power lines from local utility companies may become disconnected.

Some ways of reducing power consumption in battery power devices, as well as electrical devices powered by household current, include turning off certain portions of the device after one or more of the given portions have been idle, or unused, for a given amount of time. Thus, a timer, or similar means, may be used where the time starts to count down when current that powers a certain portion of a device falls below a threshold. Such ways are somewhat effective, in that power to a portion is shut down following a period of idle, or no, use. However, during the period until the timer instructs that power be interrupted, the controller continues to draw current, even though there is not a load drawing current from it. Furthermore, in order to sense when a load has been applied and current is needed at the output, the timer circuit continues to draw current constantly. While timer circuit current and the current drawn by the controller until shut-down may be only a few milliamps, this may make the difference in meeting an industry standard run-down time by using a larger size battery than would be required if the timer circuit did not draw current and the controller did not draw current when its output is in a no-load condition.

Thus, there is a need in the art for a method and system for immediately detecting a no-load condition at the output of the controller and shutting down power to the controller (referred to herein as sleep mode). Furthermore, there is a need in the art for the ability to 'wake' from sleep mode upon the need for power from a load on the converter output. Moreover, there is a need in the art for these features without the power usage by circuitry detecting when the load has been applied.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
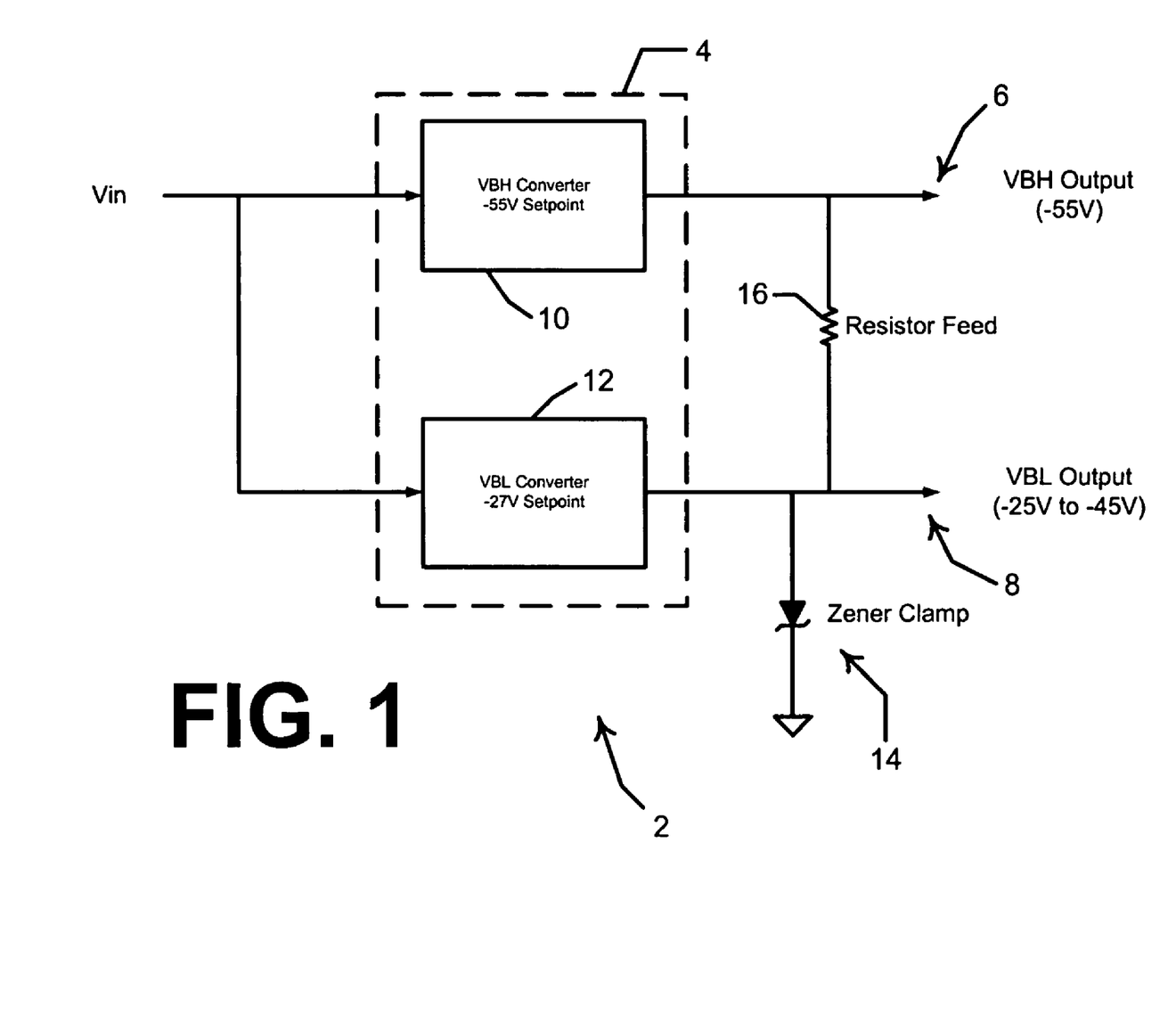
FIG. 1 illustrates a circuit for causing a power supply controller/converter for the lower voltage output to stop switching during a no-load condition in a negative voltage output powering scheme.

Turning now to the figures, FIG. 1 illustrates a power supply 2 that uses switching power supply regulator/controllers 4 to convert an input voltage $V_{in}$ into at least a high voltage output 6 and a low voltage output 8. Supply 2 is designed for use in a negative voltage output scheme. It will be appreciated that for purposes of discussion, when describing aspects in connection with a negative powering scheme, the negative voltages will not be referred to as negative, but merely as the magnitude of the voltage under discussion. This convention will also be applied to the discussion of other figures later in this description as well.

VBH controller 10 and VBL controller 12 are part of power supply system 2. Controllers 10 and 12 drive outputs 6 and 8 respectively, by controlling the duty cycle such that a desired voltage set point results at outputs 6 and 8. The use of such controllers is known in the art for receiving an unregulated input voltage and producing a regulated output voltage.

Zener diode 14 and feed resistor 16 work together to eliminate power output from the output driver stage of controller 12 when a no-load, or idle-mode, condition exists at output 8. When such a no-load condition exists at output 8, resistor 16 provides a path between output 8 and output 6, such that the voltage at output 8 is drawn towards that of the VBH voltage at output 6. Since VBH is greater in magnitude than the set point of controller 12, the switching output stage of controller 12 inherently produces an output having a 0% duty cycle, thus effectively shutting down the output stage of the controller, thereby reducing overall current draw of supply 2. To prevent the voltage at output 8 from being drawn to the VBH voltage at output 6, zener diode 14 clamps the voltage at output 8 to a voltage that is greater than the set point of controller 12 (so its output will maintain a 0% duty cycle), but within the desired range within which VBL is designed to operate. Thus, when a load is applied to output 8, the voltage present at output 8 is within the design range for the load In the preferred embodiment, set point for regulator 10 is 55 V and the set point for regulator 12 is 27 V. If zener diode 14 is selected with an avalanche voltage of 39V, then output 8 is clamped to 39V when in a no-load condition. However, since this is higher than the set point of controller 12, the controller adjusts its duty cycle to 0% because any duty cycle greater than this would cause output 8 to rise farther above the set point of 27V than it already is. Of course, in such a case, the zener diode 14 would maintain output 8 at the clamped voltage of 39V. It will be appreciated that the selection of set points for controllers 10 and 12 and the avalanche voltage of diode 14 are selected for a particular application, which in the preferred embodiment are designed to work with standard telephony voltages. However, depending on the particular application in which supply 2 is used, these values can be changed. Accordingly, it will be appreciated that the values used for the described aspect are given for the purpose of example, and are not meant to limit the range of values that can be used in a given application.

The resistance of resistor 16 is selected to be as large as possible while still maintaining the voltage at output 8 beyond the set point of controller 12 under a no-load condition. It will be appreciated that the reason for making the value of resistor 16 as large as possible is to reduce the $V^2/R$ losses in the resistor, as will be understood by those skilled in the art.

However, resistor 16 cannot be made arbitrarily large, as an absolute no-load will typically not exist. There will usually be a small load (relative to the design load, such as a telephony circuit in an off-hook condition, for example) from leakage currents at low voltage output 8 due to capacitors, feedback resistors, etc., that is provided from VBH through resistor 16. This leakage current at output 8 could cause a large enough voltage drop across resistor 16 to prevent the voltage at output 8 from exceeding the set point of controller 12 if the value of the resistor is too large. This would obviously preclude the output stage of controller 12 from entering a 0% duty cycle condition, which would eliminate the power-saving advantage that results therefrom. Therefore, the value of resistor 16 is selected to be as large as possible and still allow controller 12 to enter a 0% duty cycle condition when there is no design load present at output 8.

As discussed above, the circuit in FIG. 1 illustrates negative output scheme for supply 2. It will be appreciated that the same circuit would also work in a positive powering scheme (i.e., VBH and VBL are positive 55V and between 25 and 45V respectively) by merely reversing the installed direction of zener diode 14, so that a positive voltage of 39V (or whatever the design breakdown voltage is for a given application) at output 8 would cause zener diode 14 to breakdown and conduct in the reverse direction.

Figure 2:
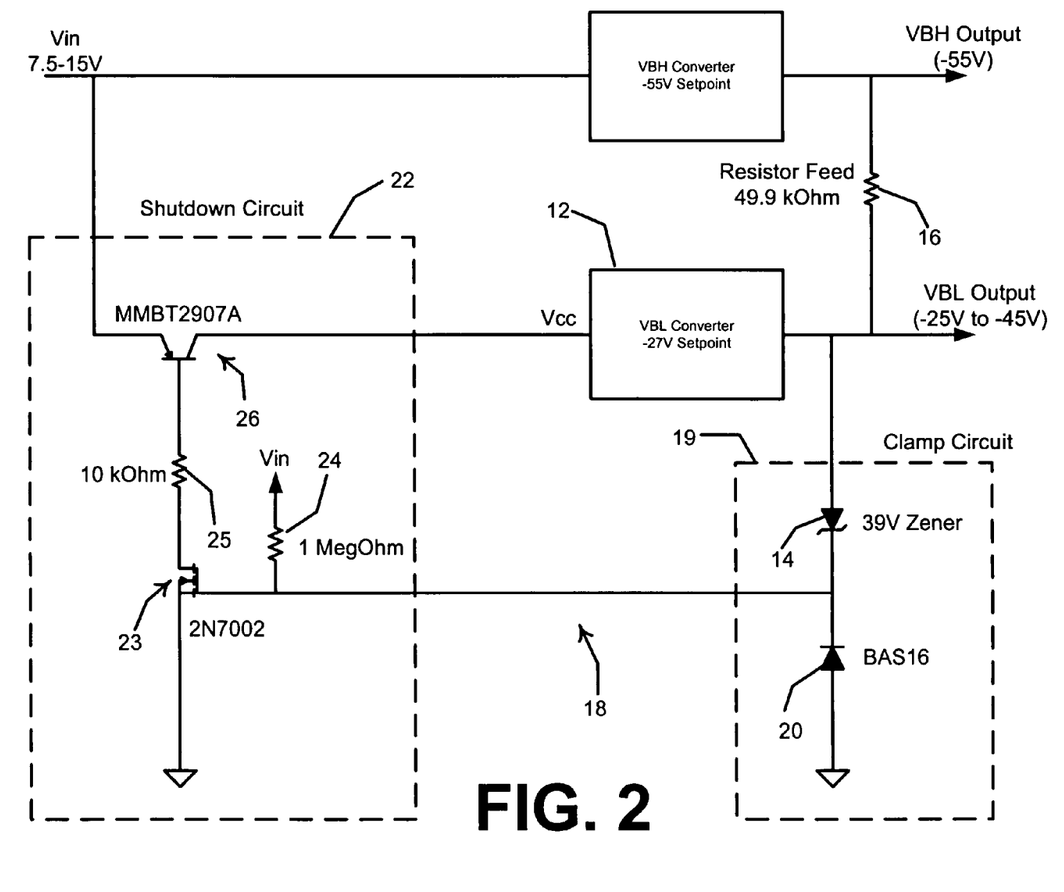
FIG. 2 illustrates a circuit for powering down a low voltage controller/converter during a no-load condition in a negative voltage output powering scheme.

Turning now to FIG. 2, a power supply system 18 (for a negative voltage output scheme) is shown that not only causes the output stage of VBL converter/controller to produce a 0% duty cycle output when a no-load condition is present at output 8, but also causes the rest of the circuitry in controller 12 to shut down, thereby preserving even more charge from a battery that is supplying power to $V_{in}$. With respect to the system described in FIG. 1, even though the output stage of controller 12 is producing a 0% duty cycle output as described during a no-load condition, and thus no current is being produced, the rest of the controller is still 'on' and drawing current. The rest of controller 12 remains on to ensure that when current is required at output 8 when a load is connected, such current will be available.

However, by modifying the circuit as shown in FIG. 1 by adding clamping circuit 19 as shown in FIG. 2, not only will the output stage of the VBL converter/controller 12 not draw any current during a no-load condition, but the entire VBL converter/controller can be shut down and be 'awakened' when current is needed for a load at output 8. By adding a forward biased standard diode 20 between reverse biased zener diode 14 and ground, and shutdown circuit 22, the entire controller 12 can be shut down upon a no-load condition on output 8, but awakened when a load is present.

When a load is present at output 8, zener diode 14 is not conducting and thus the voltage at the gate of N-Channel enhancement mode MOSFET 23 is approximately equal to $V_{in}$, as very little current is passing through resistor 24. Therefore, MOSFET 23 conducts current $I_{DS}$, thereby causing a voltage drop across resistor 25, which causes the base of PNP transistor 26 to be on and provide a supply voltage $V_{cc}$ to controller 12.

However, when a no-load condition occurs, and zener diode 14 breaks down, the gate of MOSFET 23 is pulled to a voltage level below ground that is equal to the voltage drop across the pn junction of diode 20, thereby overriding the pull-up resistor 24. When the gate of MOSFET 23 is low, it conducts very little, and the voltage on the base of PNP transistor 26 goes high, thereby causing it to shut off and prevent current from transferring from $V_{in}$ to $V_{CC}$ of converter/controller 12. When a load is connected again at output 8, zener diode 14 stops conducting, the voltage at the gate of MOSFET 23 goes high, which causes the base of transistor 26 to go low and allow current to reach the $V_{CC}$ of controller 12.

Figure 3:
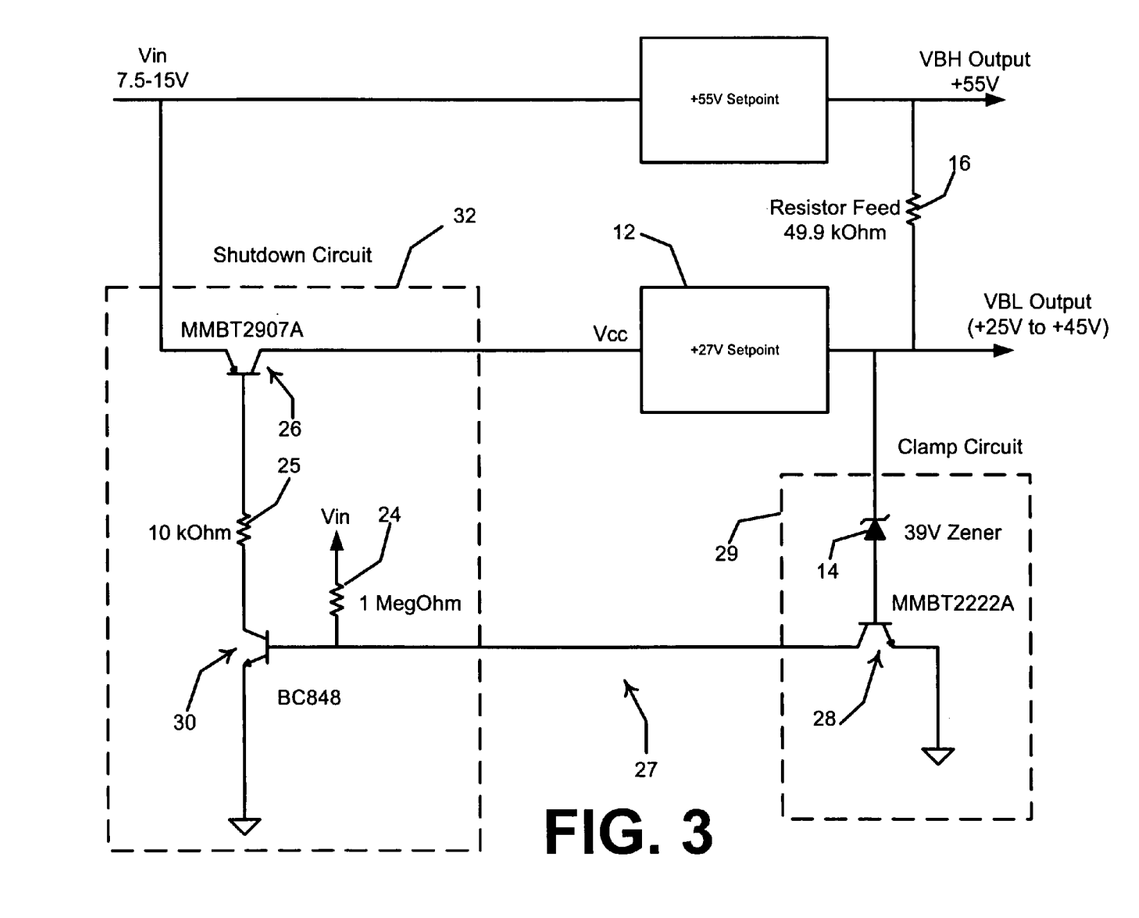
FIG. 3 illustrates a circuit for powering down a low voltage controller/converter during a no-load condition in a positive voltage output powering scheme.

For a positive output powering scheme, as shown in FIG. 3, the forward biased diode 20, shown as part of clamping circuit 19 in FIG. 2, is replaced with NPN bipolar transistor 28 in clamping circuit 29, and MOSFET 24, shown in FIG. 2, is replaced with NPN transistor 30. In addition, zener diode 14 is reversed in direction, as was discussed above in connection with modifying the circuit of FIG. 1 to accommodate a positive powering scheme. The operation of these components as used in the circuitry shown in FIG. 3 will be readily understandable by those skilled in the art to accomplish the function of shutting down controller 12 when output 8 is at a no-load condition. Therefore, further explanation of these components and their operation in the circuit shown in FIG. 3 is not provided.

The advantage of using shutdown circuit 22 and corresponding shutdown circuit 32, shown in FIGS. 2 and 3 respectively, is that inexpensive controllers 12, i.e. a model TL494, as manufactured and sold by Texas Instruments, Inc., for example, can be used that do not have a specially designated sleep pin for signaling that the controller should shut down or wake up upon the impressing of a corresponding sleep or wake voltage signal.

However, to simplify design and packaging, it may be desirable to use a more expensive controller 34, i.e. MAX1847, as manufactured by Maxim, Inc., for example, that has a dedicated sleep pin 36 to control the sleep or awake mode of the VBL controller. Instead of driving shutdown circuits 22 and 32 shown in FIGS. 2 and 3 respectively, clamping circuits 19 and 29 drive sleep pin 36 of controller 34 in FIGS. 4 and 5 respectively. The same clamping circuitry is used as shown in FIGS. 2 and 3, depending on whether the desired powering polarity scheme is negative or positive, as shown in FIGS. 4 and 5 respectively, but the shut down circuitry is eliminated.

Figure 4:
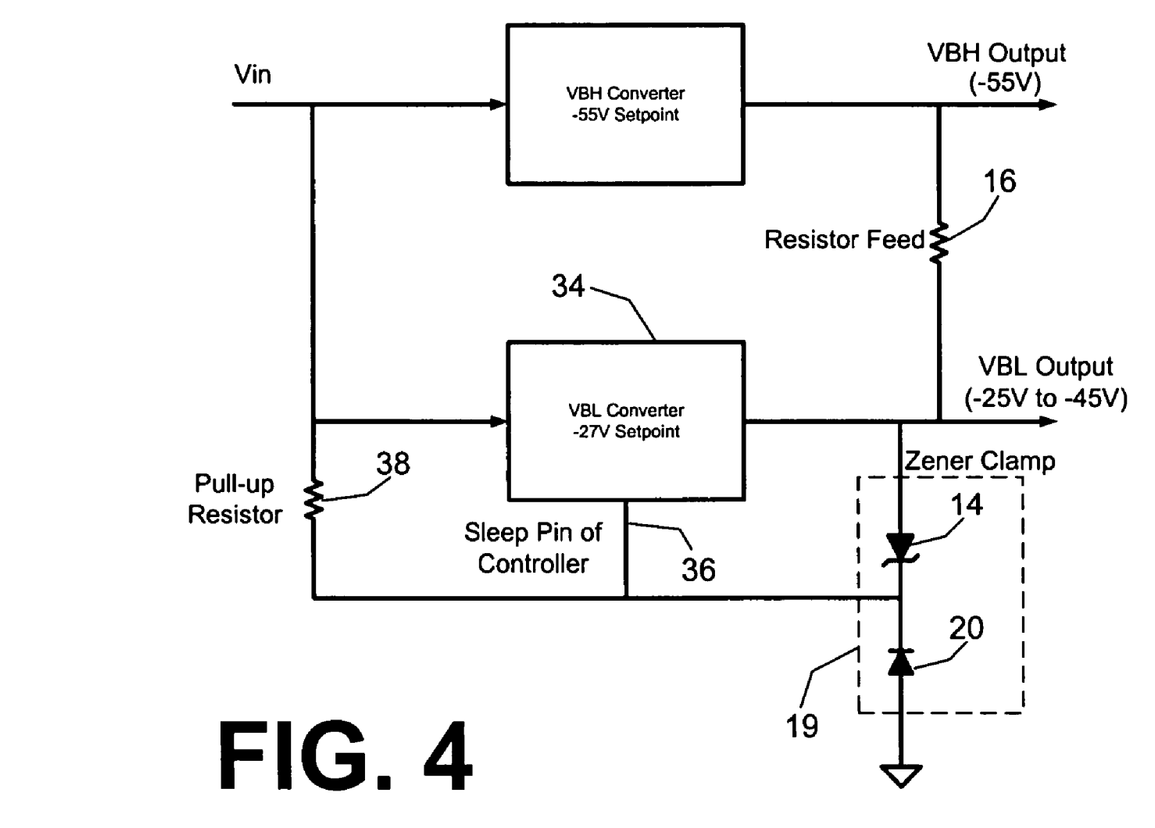
FIG. 4 illustrates a circuit for powering down a low voltage controller/converter during a no-load condition in a negative voltage output powering scheme where the controller uses a sleep pin.
Figure 5:
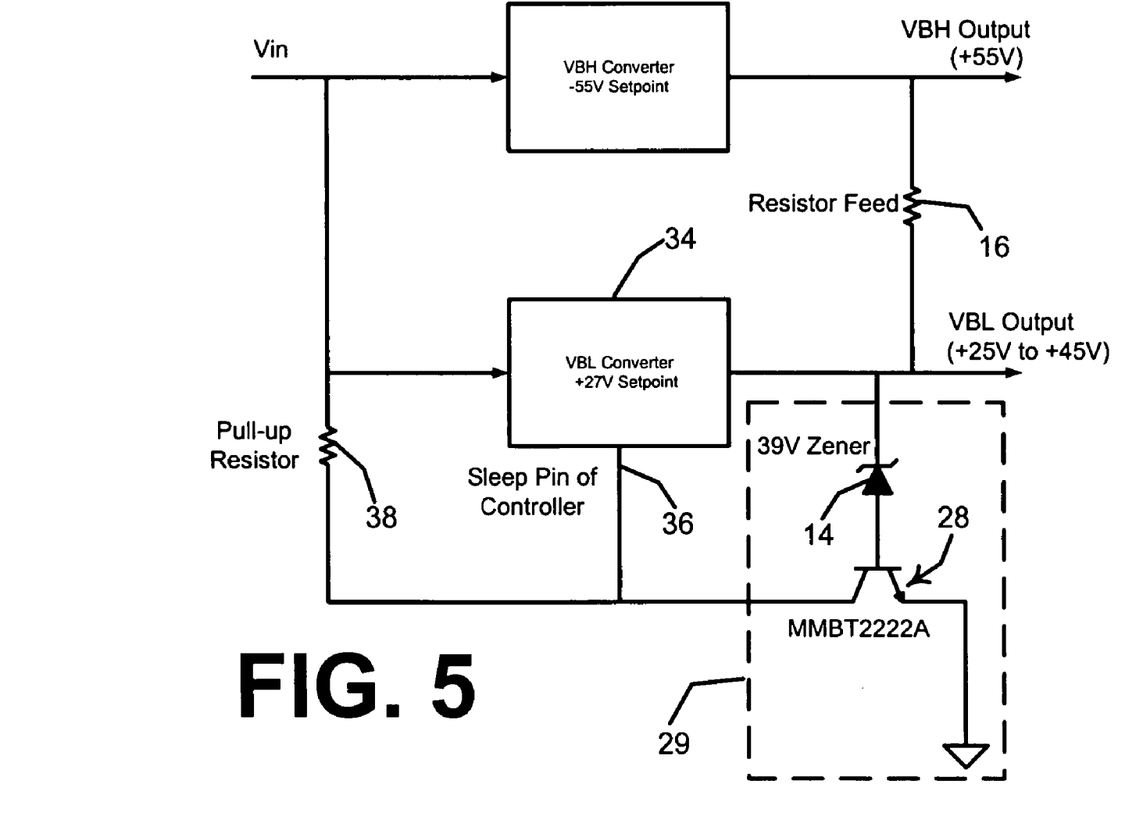
FIG. 5 illustrates a circuit for powering down a low voltage controller during a no-load condition in a positive voltage output powering scheme where the controller uses a sleep pin.

Instead, pull up resistor 38 is used to keep the voltage at sleep pin 36 high when the zener diode of the either clamping circuit 19 or 29, as shown in FIGS. 4 and 5, respectively, is not conducting. When a no-load condition causes the zener diode to conduct, as described above, the voltage at sleep pin 36 is pulled low (−0.7V across of the pn junction of diode 20 in FIG. 4, or 0.1V $V_{CE}$ of transistor 28 in FIG. 5). The sleep pin 36 shuts off the entire circuitry of controller 34 when it is low, and turns on the circuitry when it is high.

In addition to the description of the figures given above, other variations on the power saving circuitry can be made. For example, if the precise amount of leakage current during 'no-load' is known, the zener diode can be eliminated. This can be facilitated by sizing the feed resistor so that the VBL output never drops below −45V, for a negative powering scheme operating in a no-load condition at the VBL output. However, when used in a telephony application, the VBH output rail can be switched to −95V when ringing a phone, instead of −55V. Thus, the use of a zener diode with such a higher set point makes more sense because it may not be possible to limit the voltage at VBL to −45V when VBH is in −95V mode and simultaneously provide enough feed current to exceed the VBL set point when VBH is in −55V mode.

Figure 6:
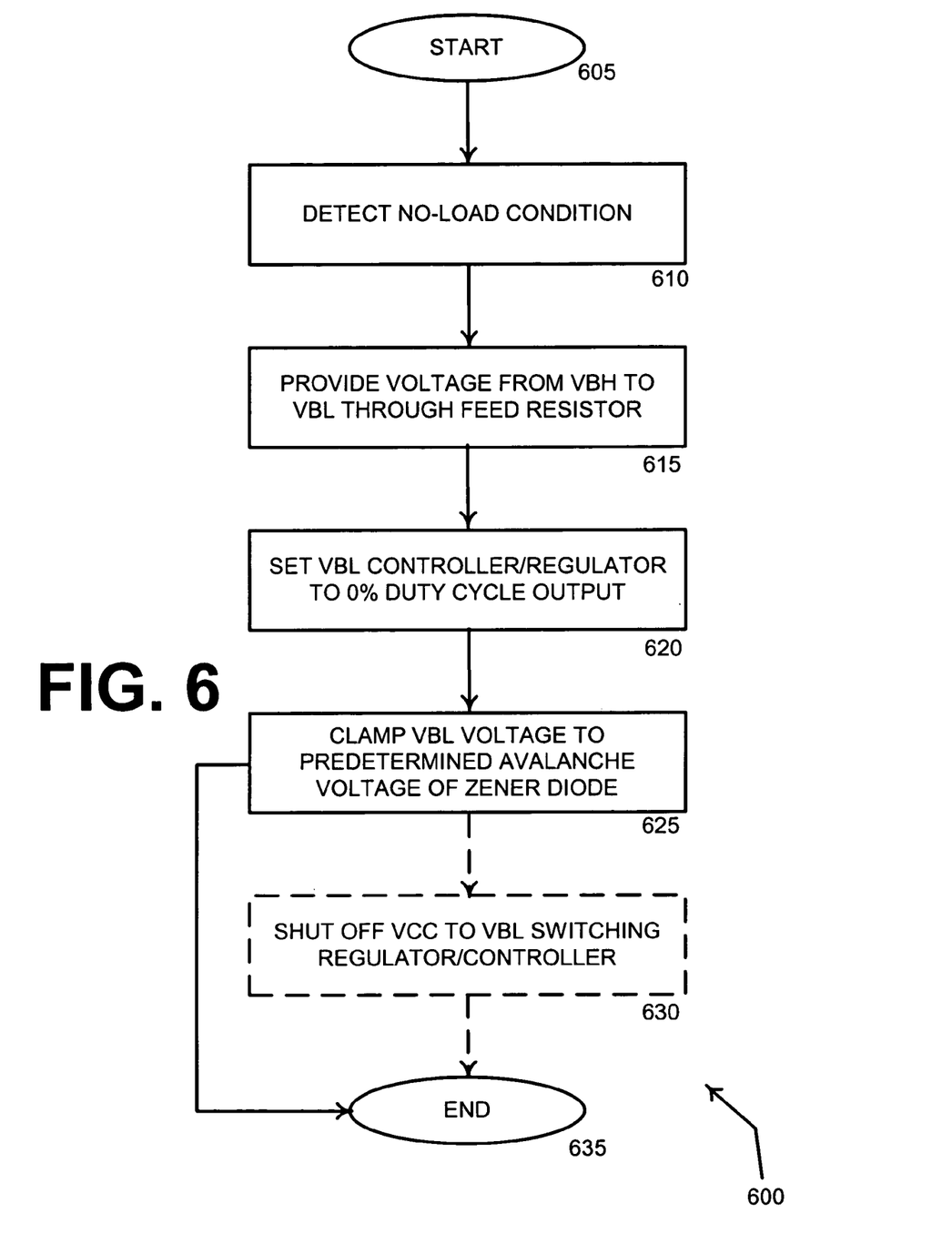
FIG. 6 illustrates a flow diagram representing a method for idling a low voltage controller during a no load condition.

Turning now to FIG. 6, the steps shown in the figure highlight the process 600 that occurs when a no-load condition occurs for a power supply system as described above in connection with the previous figures. It will be appreciated that the steps may not occur in exactly the order shown in the figure, as different selections of the various components and the values thereof may cause the steps to occur in different sequences.

The process starts at step 605 when the power supply is operating with a load on the VBL output. When the load is removed, the no-load condition is detected at step 610 when the feed resistor starts conducting current from the VBH output to the VBL output at step 615. As the voltage at the VBL output rises past its set point controlled by a switching regulator/controller, the regulator/controller sets its output to a 0% duty cycle at step 620, and therefore does not put out any current, because the voltage at its output is already higher than its set point.

Then, the zener diode starts to starts conducting current at step 625 in the reverse-bias direction and clamps the VBL output to the predetermined voltage level, which is controlled by the selection of zener diode and its breakdown, or avalanche, voltage. Then, if the power supply system is optionally configured, in addition to providing a 0% duty cycle from the output of the VBL controller, to also completely shut down said controller, complete shutdown occurs at step 630 by either providing a low voltage signal to a sleep pin of the VBL controller, if the controller is so equipped, or by activating a shutdown circuit that switches off the $V_{CC}$ current to the VBL controller. This optional step is shown connected to ending step 635 with broken lines to show that it is an optional step. The ending step occurs when load is restored to the VBL output and enough current cannot be supplied through the feed resistor to maintain the VBL output voltage higher than the controller set point voltage. Accordingly, upon restoration of VBL load, the VBL voltage controller resumes providing an output greater than a 0% duty cycle and current is provided to the VBL output load from the VBL output.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents. The aspects described herein are useful in the telephony, broad band and other communication system types. In addition, any device, such as for example, a computer, that uses batteries may also incorporate the aspects, as well as devices that are not battery-powered, but are designed to use as little power as possible to operate.

We claim:

1. A system for reducing idle-mode power dissipation in a switching power supply having at least a high voltage output and a low voltage output, comprising:
    means for clamping the low voltage output to a predetermined non-zero voltage upon the detection of a no-load condition on the low voltage output; and
    means for maintaining the predetermined voltage at the low voltage output, the maintaining means being connected between the high voltage output and the low voltage output.

2. The system of claim 1 wherein the clamping means includes a reverse-biased zener diode connected between the low voltage output and ground wherein the output potentials of the power supply are negative with respect to ground.

3. The system of claim 1 wherein the clamping means includes a forward-biased zener diode connected between the low voltage output and ground wherein the output potentials of the power supply are positive with respect to ground.

4. The system of claim 1 wherein the voltage-maintaining means includes a resistor connected between the low voltage output and the high voltage output.

5. The system of claim 1 wherein a switching controller/converter having a predetermined set point is connected between an input to the power supply and the high voltage output.

6. The system of claim 1 wherein switching controller/converter having a predetermined set point is connected between an input to the power supply and the low voltage output.

7. A system for reducing idle-mode power dissipation in a power supply having a low-voltage voltage switching controller/converter connected between an input to the power supply and a low voltage output and a high-voltage switching controller/converter connected between the input to the power supply and a high voltage output, comprising:
   means for clamping the low voltage output to a non-zero predetermined voltage upon the detection of a no-load condition on the low voltage output;
   means for maintaining the predetermined voltage at the low voltage output, the maintaining means being connected between the high voltage output and the low voltage output, and
   means for shutting down the low-voltage voltage controller/converter while the no-load condition is present on the low voltage output.

8. The system of claim 7 wherein the means for shutting down the low-voltage controller/converter includes a control input, a supply input and a supply output.

9. In the system of claim 8 wherein the output potentials of the high voltage output and the low voltage output are negative with respect to ground, the clamping means includes a reverse-biased zener diode connected in series with a forward biased diode between the low voltage output and ground, the anode of the zener diode being connected to the low voltage output and the anode of the forward biased diode connected to ground such that the cathodes of the reverse-biased zener diode and the forward biased diode are connected together at a cathode node.

10. The system of claim 9 wherein the control input to the shut-down means is connected to the cathode node, the supply input of the shut-down means is connected to the power supply input and the output of the shut-down means is connected to the supply input to the low-voltage controller such that when the low-voltage output is in a no-load condition, the cathode node attains the bias voltage of the forward biased diode, such that the cathode node voltage provides a voltage at the control input to the shutdown means that causes the shut-down means to interrupt power from the power supply input to the low-voltage controller input when the zener diode breaks down, while providing for the shut-down means to allow power to transfer from the power supply input to the low voltage controller input when the zener diode does not conduct in the reverse direction.

11. In the system of claim 8, wherein the output potentials of the high voltage output and the low voltage output are positive with respect to ground, the clamping means includes a reverse-biased zener diode having its anode connected to the base of a common-emitter-connected NPN transistor and its cathode connected to the low voltage output.

12. The system of claim 11 wherein the control input to the shut-down means is connected to the collector of the common-emitter-connected NPN transistor, the supply input of the shut-down means is connected to the power supply input and the output of the shut-down means is connected to a supply input of the low-voltage controller such that when the low-voltage output is in a no-load condition, the collector voltage $V_{CE}$ of the NPN transistor provides a voltage at the control input to the shutdown means that causes the shut-down means to interrupt power from the power supply input to the low-voltage controller input when the zener diode breaks down, while providing for the shut-down means to allow power to transfer from the power supply input to the low voltage controller input when the zener diode does not conduct in the reverse direction.

13. In the system of claim 7 wherein the output potentials of the high voltage output and the low voltage output are negative with respect to ground, the clamping means includes a reverse-biased zener diode connected in series with a forward biased diode between the low voltage output and ground, the anode of the zener diode being connected to the low voltage output and the anode of the forward biased diode being connected to ground such that the cathodes of the reverse-biased zener diode and the forward biased diode are connected together at a cathode node and the cathode node is connected to a sleep pin for turning off the low voltage controller, the system further comprising a pull-up resistor connected between the sleep pin and the low voltage controller supply input.

14. In the system of claim 7, wherein the output potentials of the high voltage output and the low voltage output are negative with respect to ground, the clamping means includes a reverse-biased zener diode connected in series with a forward biased diode between the low voltage output and ground, the anode of the zener diode being connected to the low voltage output and the anode of the forward biased diode connected to ground such that the cathodes of the reverse-biased zener diode and the forward biased diode are connected together at a cathode node and the cathode node is connected to a sleep pin for turning off the low voltage controller.

15. The system of claim 7 wherein the voltage-maintaining means includes a resistor connected between the low voltage output and the high voltage output.

16. In the system of claim 7, wherein the output potentials of the high voltage output and the low voltage output are positive with respect to ground, the clamping means includes a reverse-biased zener diode having its anode connected to the base of a common-emitter-connected NPN transistor, the cathode of the zener diode being connected to the low voltage output, the collector of said NPN transistor being connected to a sleep pin for turning off the low voltage controller, the system further comprising a pull-up resistor connected between the sleep pin and the low voltage controller supply input.

17. A method for reducing idle-mode power dissipation in a switching power supply having at least a high voltage output controller/converter for controlling the voltage at a high voltage output and having a low voltage controller/converter for controlling the voltage at a low voltage output, comprising:
   detecting a no-load condition on the low voltage output;
   providing current from the high voltage output to the low voltage output through a means for maintaining a non-zero predetermined voltage at the low voltage output; and
   clamping the low voltage output to the predetermined voltage that is higher in magnitude with respect to ground than an output set point of the low voltage controller.

18. The method of claim 17, further comprising interrupting power being transferred from a supply input of the power supply to a supply input of the low voltage controller during a no-load condition.

19. The method of claim 18 wherein power is interrupted to the supply input of the low voltage controller by impressing a control signal on a sleep pin.

20. The method of claim 17 wherein the means for maintaining he predetermined voltage at the low voltage output includes a resistor.

21. The method of claim 17 wherein the clamping means includes a zener diode.

* * * * *